(12) United States Patent
Dohi et al.

(10) Patent No.: US 10,684,457 B2
(45) Date of Patent: Jun. 16, 2020

(54) MICROSCOPE APPARATUS

(71) Applicant: OLYMPUS CORPORATION, Hachioji-shi, Tokyo (JP)

(72) Inventors: Masahito Dohi, Tokyo (JP); Yoshihiro Shimada, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 41 days.

(21) Appl. No.: 15/871,368

(22) Filed: Jan. 15, 2018

(65) Prior Publication Data

US 2018/0284411 A1 Oct. 4, 2018

(30) Foreign Application Priority Data

Mar. 30, 2017 (JP) ................................. 2017-066797

(51) Int. Cl.
*G02B 21/00* (2006.01)
*G02B 21/16* (2006.01)
(Continued)

(52) U.S. Cl.
CPC ......... *G02B 21/0032* (2013.01); *G02B 15/04* (2013.01); *G02B 21/0048* (2013.01);
(Continued)

(58) Field of Classification Search
CPC .............. G02B 21/002; G02B 21/0032; G02B 21/0036; G02B 21/0048; G02B 21/0076; G02B 21/06; G02B 21/16
(Continued)

(56) References Cited

U.S. PATENT DOCUMENTS 7,538,879 B2 * 5/2009 Power ................ G01N 21/8422
356/432
7,554,725 B2 6/2009 Stelzer et al.
(Continued)

FOREIGN PATENT DOCUMENTS

JP 2008250303 A 10/2008
JP 2011215644 A 10/2011
(Continued)

OTHER PUBLICATIONS

Extended European Search Report (EESR) dated Jul. 25, 2018 issued in counterpart European Application No. 18152723.5.
(Continued)

*Primary Examiner* — Nicholas R. Pasko
(74) *Attorney, Agent, or Firm* — Holtz, Holtz & Volek PC

(57) ABSTRACT

A microscope apparatus 10 includes a detection optical system 12 that captures light from a sample S and an illumination optical system 11 that radiates an illumination light onto the sample S. The illumination optical system 11 includes a cylindrical lens 5 that has a power in a first-axis direction and does not have a power in a second-axis direction that is perpendicular to the first-axis direction, a cylindrical lens 6 that has a power in the second-axis direction and does not have a power in the first-axis direction, and a scanner 4 that scans the illumination light in a width direction. The illumination optical system 11 is configured such that the first-axis direction is the width direction described above, and the cylindrical lenses 5 and 6 are arranged posterior to the scanner 4.

14 Claims, 12 Drawing Sheets

(51) Int. Cl.
*G02B 21/36* (2006.01)
*G02B 27/09* (2006.01)
*G02B 15/04* (2006.01)

(52) U.S. Cl.
CPC ......... *G02B 21/0076* (2013.01); *G02B 21/16* (2013.01); *G02B 21/367* (2013.01); *G02B 27/0911* (2013.01); *G02B 27/0966* (2013.01)

(58) Field of Classification Search
USPC ........ 359/368, 385, 386, 387, 388, 389, 390
See application file for complete search history.

(56) References Cited

U.S. PATENT DOCUMENTS

| | | | |
|---|---|---|---|
| 8,192,030 B2 | 6/2012 | Mizushima et al. | |
| 8,848,268 B2 | 9/2014 | Lippert et al. | |
| 8,970,950 B2 | 3/2015 | Stelzer | |
| RE45,575 E | 6/2015 | Lippert et al. | |
| 10,007,100 B2* | 6/2018 | Kikuchi | G02B 21/0048 |
| 10,018,819 B2 | 7/2018 | Iguchi et al. | |
| 2006/0033987 A1 | 2/2006 | Stelzer et al. | |
| 2007/0109633 A1 | 5/2007 | Stelzer | |
| 2008/0151238 A1* | 6/2008 | Zhu | G02B 21/06 356/317 |
| 2009/0225413 A1 | 9/2009 | Stelzer et al. | |
| 2009/0237765 A1 | 9/2009 | Lippert et al. | |
| 2010/0053565 A1 | 3/2010 | Mizushima et al. | |
| 2010/0265575 A1* | 10/2010 | Lippert | G02B 27/0911 359/385 |
| 2011/0304723 A1* | 12/2011 | Betzig | G02B 21/0004 348/79 |
| 2012/0206798 A1* | 8/2012 | Knop | G02B 21/367 359/385 |
| 2012/0281264 A1* | 11/2012 | Lippert | G02B 21/0032 359/199.3 |
| 2014/0042339 A1 | 2/2014 | Stelzer et al. | |
| 2014/0218794 A1* | 8/2014 | Hohng | G02B 21/0076 359/385 |
| 2015/0198794 A1 | 7/2015 | Rondeau | |
| 2016/0124201 A1 | 5/2016 | Kikuchi | |
| 2016/0306154 A1 | 10/2016 | Iguchi et al. | |

FOREIGN PATENT DOCUMENTS

| | | |
|---|---|---|
| JP | 2016091006 A | 5/2016 |
| WO | 2011120629 A1 | 10/2011 |

OTHER PUBLICATIONS

Office Action (Final Rejection) dated Jun. 30, 2017 issued in U.S. Appl. No. 14/924,435.
Office Action (Non-Final Rejection) dated Dec. 30, 2016 issued in U.S. Appl. No. 14/924,435.
Office Action (Non-Final Rejection) dated Nov. 14, 2017 issued in U.S. Appl. No. 14/924,435.

* cited by examiner

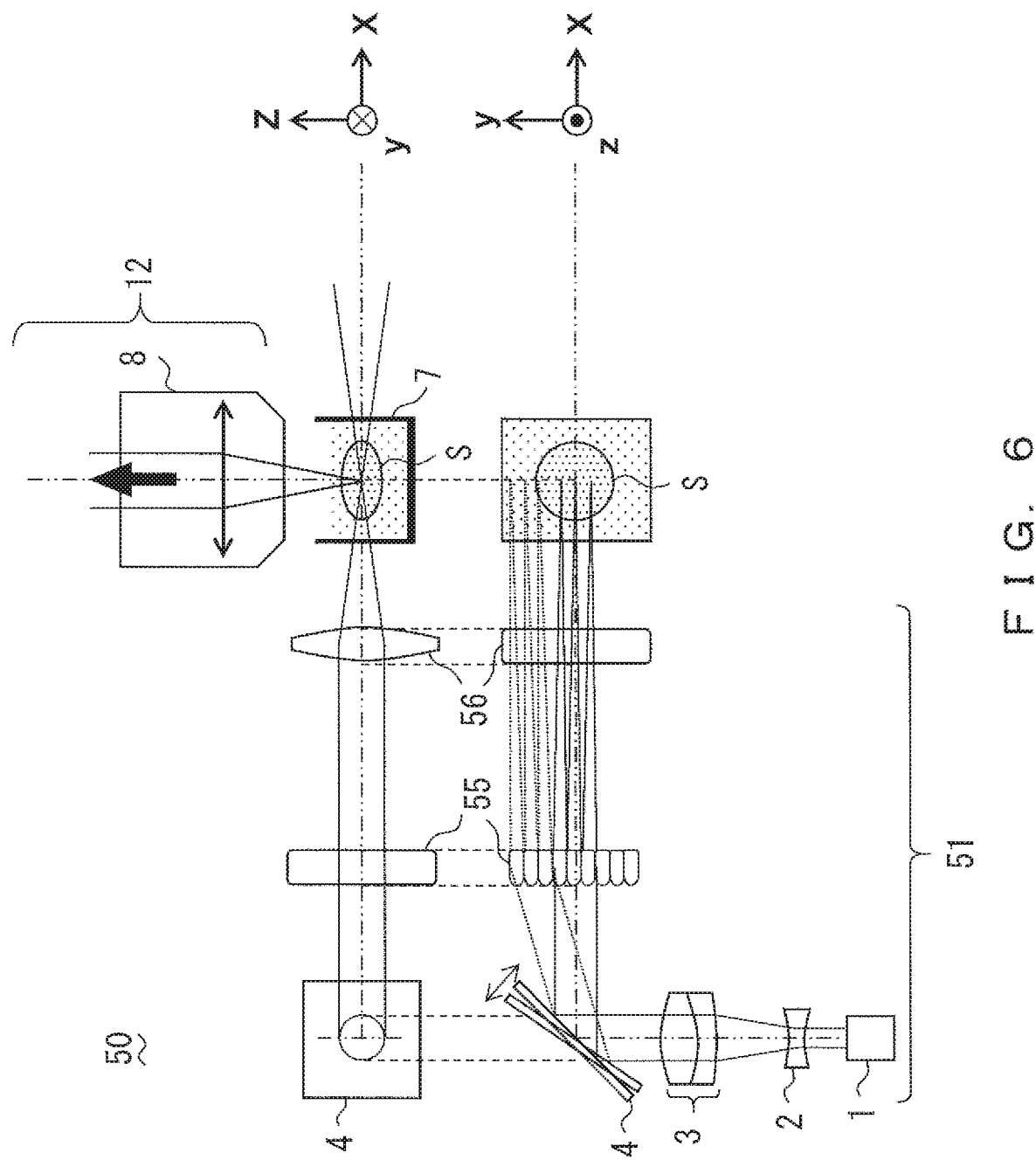
F I G. 6

MICROSCOPE APPARATUS

CROSS REFERENCE TO RELATED APPLICATIONS

This application is based upon and claims the benefit of priority from prior Japanese Patent Application No. 2017-066797, filed Mar. 30, 2017, the entire contents of which are incorporated herein by this reference.

BACKGROUND OF THE INVENTION

Field of the Invention

The present invention relates to a microscope apparatus for performing observation using fluorescence from a biological sample.

Description of the Related Art

Light-sheet microscopy is known as a method for performing observation that includes detecting fluorescence generated from a biological sample. Light-sheet microscopy forms a sheet-shaped illumination light (a sheet light) in a plane to be observed (an observation plane) that is perpendicular to a detection optical axis, and obtains fluorescence generated from the observation plane. Thus, light-sheet microscopy is characterized in that an illumination light is not radiated onto any places other than the observation plane, which results in being able to suppress fading of a biological sample.

Japanese Laid-open Patent Publication No. 2008-250303 and Japanese Laid-open Patent Publication No. 2016-091006 are documents that disclose a technology of light-sheet microscopy.

In general, when observation is performed by light-sheet microscopy, it is important to prevent a shadow from being created due to, for example, a foreign substance or unevenness on a sample S, or diffusion. Japanese Laid-open Patent Publication No. 2008-250303 has proposed a method for removing a shadow, the method including scanning a sheet light or an elliptic beam using a scanner and temporally changing an angle of an illumination light radiated onto a sample.

Japanese Laid-open Patent Publication No. 2016-091006 discloses a method for scanning a sheet light diverged (or converged) in a width direction as a method for performing a uniform sheet light illumination without using a Powell lens. Illumination is performed from a different direction in an observation plane by scanning a sheet light, so it is possible to prevent a shadow from being created due to, for example, a foreign substance or unevenness on the sample S.

SUMMARY OF THE INVENTION

A microscope apparatus according to an aspect of the present invention includes: a detection optical system that captures light from a sample; and an illumination optical system that has an optical axis oriented in a direction different from an optical axis of the detection optical system and that radiates an illumination light onto the sample, wherein the illumination optical system includes a first optical-axis-asymmetric optical system that has a power in a first-axis direction and does not have a power in a second-axis direction that is perpendicular to the first-axis direction, a second optical-axis-asymmetric optical system that has a power in the second-axis direction and does not have a power in the first-axis direction, and a scanning unit that scans the illumination light in a width direction that is perpendicular to the optical axis of the detection optical system and the optical axis of the illumination optical system; the illumination optical system is configured such that the first-axis direction is the width direction; the first optical-axis-asymmetric optical system and the second optical-axis-asymmetric optical system are arranged posterior to the scanning unit; and the illumination optical system concentrates the illumination light so as to form an optical spot within a field of view of the detection optical system, and scans the optical spot so as to form a sheet light.

An illumination device according to an aspect of the present invention includes an illumination optical system that includes a first optical-axis-asymmetric optical system that has a power in a first-axis direction and does not have a power in a second-axis direction that is perpendicular to the first-axis direction; a second optical-axis-asymmetric optical system that has a power in the second-axis direction and does not have a power in the first-axis direction; and a scanning unit that scans an illumination light in a width direction that is perpendicular to an optical axis of the illumination optical system, wherein the illumination optical system is configured such that the first-axis direction is the width direction, the first optical-axis-asymmetric optical system and the second optical-axis-asymmetric optical system are arranged posterior to the scanning unit, and the illumination optical system concentrates the illumination light so as to form an optical spot, and scans the optical spot so as to form a sheet light.

BRIEF DESCRIPTION OF THE DRAWINGS

The present invention will be more apparent from the following detailed description when the accompanying drawings are referenced.

FIG. 6 illustrates a configuration of a microscope apparatus according to a fifth embodiment;

DESCRIPTION OF THE EMBODIMENTS

Figure 1:
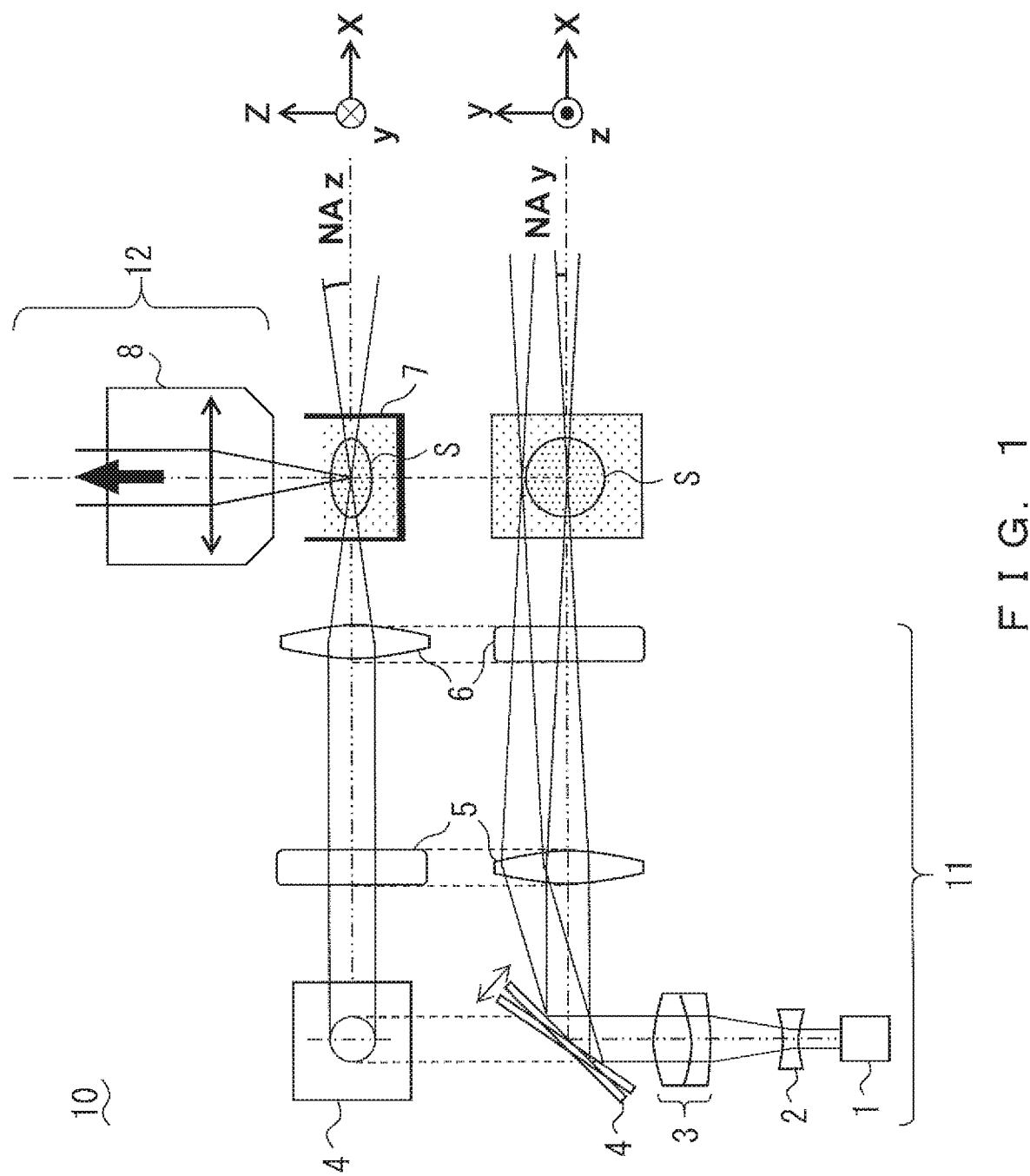
FIG. 1 illustrates a configuration of a microscope apparatus according to a first embodiment.
Figure 9:
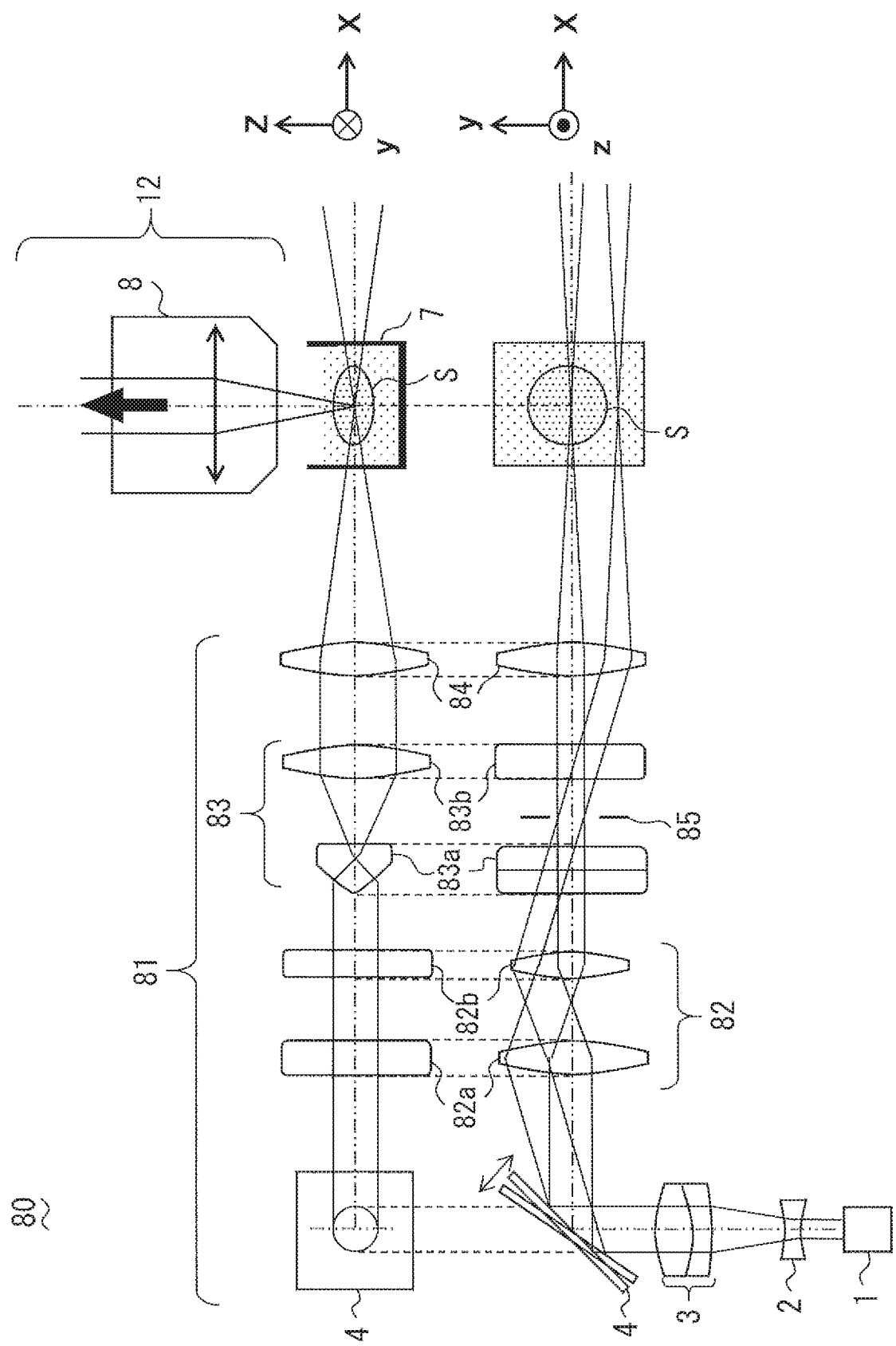
FIG. 9 illustrates a configuration of a microscope apparatus according to an eighth embodiment.

In Japanese Laid-Open Patent Application Publication No. 2008-250303, there is a great difference in an amount of light between that in a central region and that in an outer region of a sheet light when a laser is used as a light source, so an element that makes a beam intensity distribution uniform, such as a Powell lens, is indispensable, as illustrated in FIG. 1 of Japanese Laid-Open Patent Application Publication No. 2008-250303. The Powell lens is not suitable for a multicolor illumination optical system because it is very expensive and has different characteristics of a diffusion angle for each wavelength. Further, when an elliptic beam is scanned and concentrated on a spherical lens, as illustrated in FIG. 9 of Japanese Laid-Open Patent Application Publication No. 2008-250303, there is a fundamental problem in which an astigmatism or a coma occurs on the spherical lens, which results in an increase in a sheet thickness in an outer region of a sheet light.

On the other hand, in Japanese Laid-Open Patent Application Publication No. 2016-091006, a cylindrical lens is used to concentrate a sheet light. Thus, an astigmatism or a coma does not occur as in Japanese Laid-Open Patent Application Publication No. 2008-250303, but a sheet light is formed that spreads widely in a width direction in an observation plane. Thus, there is a need to radiate a larger area than that of a sample in order to make the brightness in the observation plane uniform. In other words, a radiated area is unnecessarily increased in the biological sample in the width direction, which results in fading in the biological sample or in making a scanning speed lower.

It is important to suppress an excess light radiation upon observing a biological sample because such an excess light radiation may damage the biological sample. Thus, an apparatus is desired to be configured such that the advantage of suppressing fading is not lost, the advantage being essentially provided by light-sheet microscopy.

In light of the problem described above, an object of the present invention is to provide a microscope apparatus that can sufficiently suppress light fading of a sample due to observation and provide a better illumination optical performance while suppressing an aberration.

A microscope apparatus according to a first embodiment of the present invention is described. FIG. 1 illustrates a configuration of a microscope apparatus 10 according to the present embodiment.

The microscope apparatus 10 includes an illumination optical system 11 and a detection optical system 12. The illumination optical system 11 and the detection optical system 12 have respective optical axes oriented in directions different from each other. In the present embodiment, a direction of the optical axis of the detection optical system 12 (Z-axis direction) and a direction of the optical axis of the illumination optical system 11 (X-axis direction) are perpendicular to each other, as illustrated in FIG. 1.

The illumination optical system 11 is an optical system that radiates an illumination light onto a sample S. The sample S is, for example, a biological sample and is accommodated in a light transmissive container 7 along with, for example, a culture solution, the light transmissive container 7 being fixed on a stage (not illustrated) included in the microscope apparatus 10. The configuration in the microscope apparatus 10 until an illumination light is radiated onto the sample S is also referred to as an illumination device.

The illumination optical system 11 includes a light source 1, a lens 2, a lens 3, a scanner 4, and cylindrical lenses 5 and 6.

The light source 1 outputs an illumination light that is an excitation light. The lens 2 and the lens 3 guide the illumination light output by the light source 1 to the scanner 4. Here, the lens 2 and the lens 3 play a role in adjusting the size of a diameter of a beam of the illumination light guided to the scanner 4 so as to convert the illumination light beam into a collimated beam. Specifically, the lens 2 diverges the illumination light beam and the lens 3 converts the diverged illumination light beam into a collimated beam. In other words, in the configuration illustrated in FIG. 1, an illumination light is converted into a collimated beam having an increased diameter, compared to the diameter of a beam of the illumination light when the illumination light is emitted from the light source 1.

The scanner 4 deflects the illumination light in a Y-axis direction illustrated in FIG. 1, that is, in a direction (width direction) that is perpendicular to the optical axis of the illumination optical system 11 and to the optical axis of the detection optical system 12, and changes the deflection direction. Thus, the scanner 4 serves as a scanning unit because the scanner 4 scans an optical spot formed on the sample S in the width direction. In this configuration, the illumination optical system 11 is not configured to scan an illumination light in the Z-axis direction (thickness direction), but it may be configured to change, in the Z-axis direction, the position to be radiated with an illumination light by moving the stage.

Further, it is preferable that the scanner 4 be arranged in a front focal plane of the cylindrical lens 5. Here, the side of the light source 1 is defined as "front", and the side of the sample S is defined as "rear". When the scanner 4 is arranged in the front focal plane of the cylindrical lens 5, it will be possible to make a principal ray of an illumination light emitted from the cylindrical lens 5 parallel to the X axis even if the deflection direction of the illumination light is changed by the scanner 4. In other words, the illumination optical system 11 becomes a telecentric optical system. If the illumination optical system 11 is a telecentric optical system, the uniformity of an illumination light radiated onto the sample S can be ensured when the illumination light is scanned by the scanner 4.

The cylindrical lenses 5 and 6 are arranged posterior to the scanner 4. The cylindrical lens 5 is an optical-axis-asymmetric element that has a power in a first-axis direction and does not have a power in a second-axis direction. In the present embodiment, the cylindrical lens 5 is arranged such that the first-axis direction is the Y-axis direction (width direction) and the second-axis direction is the Z-axis direction (thickness direction). The cylindrical lens 5 is placed so as to concentrate, in the first-axis direction, the illumination light from the scanner 4 onto the sample S arranged on the stage.

The cylindrical lens 6 is an optical-axis-asymmetric element that has a power in the second-axis direction and does not have a power in the first-axis direction. The cylindrical lens 6 is placed so as to concentrate, in the second-axis direction, the illumination light from the scanner 4 onto the sample S arranged on the stage.

Here, the cylindrical lens 5 and the cylindrical lens 6 concentrate the illumination light in the first-axis direction and the second-axis direction, respectively, so as to form an optical spot, the position to be radiated, on the sample S. In other words, the configuration is made such that the cylindrical lens 5 and the cylindrical lens 6 concentrate light onto substantially the same position in the X-axis direction. Further, the diameter of a formed optical spot is determined according to an emission-side light concentration NA (numerical aperture) in the first-axis direction and an emission-side light concentration NA in the second-axis direction, the formed optical spot providing a circular or elliptic intensity distribution in a cross section in a YZ plane.

Further, both the optical-axis-asymmetric element that has a power in the first-axis direction and the optical-axis-asymmetric element that has a power in the second-axis direction are not limited to being configured to include only one cylindrical lens. For example, instead of the cylindrical lens 5, an optical-axis-asymmetric optical system may be arranged that includes a plurality of optical-axis-asymmetric elements (a plurality of optical-axis-asymmetric lenses) that each have a power in the first-axis direction and do not have a power in the second-axis direction. Likewise, instead of the cylindrical lens 6, an optical-axis-asymmetric optical system may be arranged that includes a plurality of optical-axis-asymmetric elements (a plurality of optical-axis-asymmetric lenses) that each have a power in the second-axis direction and do not have a power in the first-axis direction. A driving mechanism such as a zoom lens can be provided in a lens group by providing a plurality of lens groups.

The detection optical system 12 includes an objective 8 that captures fluorescence from the sample S. The objective 8 guides the captured fluorescence to an arbitrary photodetector (not illustrated) of the microscope apparatus 10, which makes it possible to observe the sample S. The photodetector may be an imaging element or a photomultiplier tube (PMT), or a configuration of a stereomicroscope in which an image of light is formed in the eye of an observer. The detection optical system 12 may include a plurality of lenses other than the objective 8 so as to guide fluorescence to the photodetector using the objective 8 and the plurality of lenses.

The microscope apparatus 10 having the configuration described above makes it possible to suppress a lateral aberration in an illumination optical system so as to perform a better observation by light-sheet microscopy. When a sheet light (such as parallel light and divergent light) that has a width and is not concentrated in the Y-axis direction on the sample S is formed, a radiated area on the sample S will be unnecessarily increased in the width direction if scanning is performed in the Y-axis direction such that illuminance is uniform, and this will result in readily fading the sample S. In other words, a sheet light is also radiated onto a region on the sample S that is outside of an observed range, which encourages the sample S to be faded. On the other hand, according to this configuration, an optical spot is formed using the cylindrical lens 5 and the cylindrical lens 6, so a radiated area on the sample S will not be unnecessarily increased even if the scanner 4 scans an illumination light in the first-axis direction (Y-axis direction). Thus, it is possible to sufficiently suppress light fading of the sample S due to observation.

Further, in this configuration, after light passes through the scanner 4, which is a scanning unit, a sheet light is formed on the sample S using an optical-axis-asymmetric optical system (the cylindrical lens 5) that only contributes toward concentrating light in the Y-axis direction and an optical-axis-asymmetric optical system (the cylindrical lens 6) that only contributes toward concentrating light in the Z-axis direction. For example, when a formed sheet light is concentrated in a diameter direction using one spherical lens, a so-called lateral aberration (such as astigmatism and a coma) may occur in which light passing through a lens edge is shifted closer to a central region of a lens so as to be focused on the lens. On the other hand, the usage of a cylindrical lens makes it possible to suppress an aberration that occurs due to light passing through a lens edge, compared to when a spherical lens is used. Thus, it is possible to perform observation while maintaining a detection resolution that a sheet light originally has, without spreading light in the Z-axis direction due to a lateral aberration and decreasing the detection resolution.

Further, the usage of the cylindrical lens 5 and the cylindrical lens 6 makes it possible to independently adjust a component of a formed sheet light in the Z-axis direction (second-axis direction) and a component of the formed sheet light in the Y-axis direction (first-axis direction) without each component being affected by the other component in the other direction. Thus, a lens is designed more easily than a spherical lens when there is a need to adjust a thickness of a sheet light that contributes toward a resolution in the Z-axis direction, or a sheet width.

It is preferable that the emission-side light concentration NA in the first-axis direction not be less than 0.04. It is expected that the advantage of suppressing a creation of a shadow due to a foreign substance or unevenness on the sample S will be provided if the emission-side light concentration NA in the first-axis direction is not less than 0.04 because illumination is sufficiently performed from a different direction on the sample S upon scanning a sheet light in the Y-axis direction (first-axis direction).

As described above, the microscope apparatus 10 makes it possible to suppress fading of the sample S due to observation and to perform a better observation by light-sheet microscopy.

Figure 2:
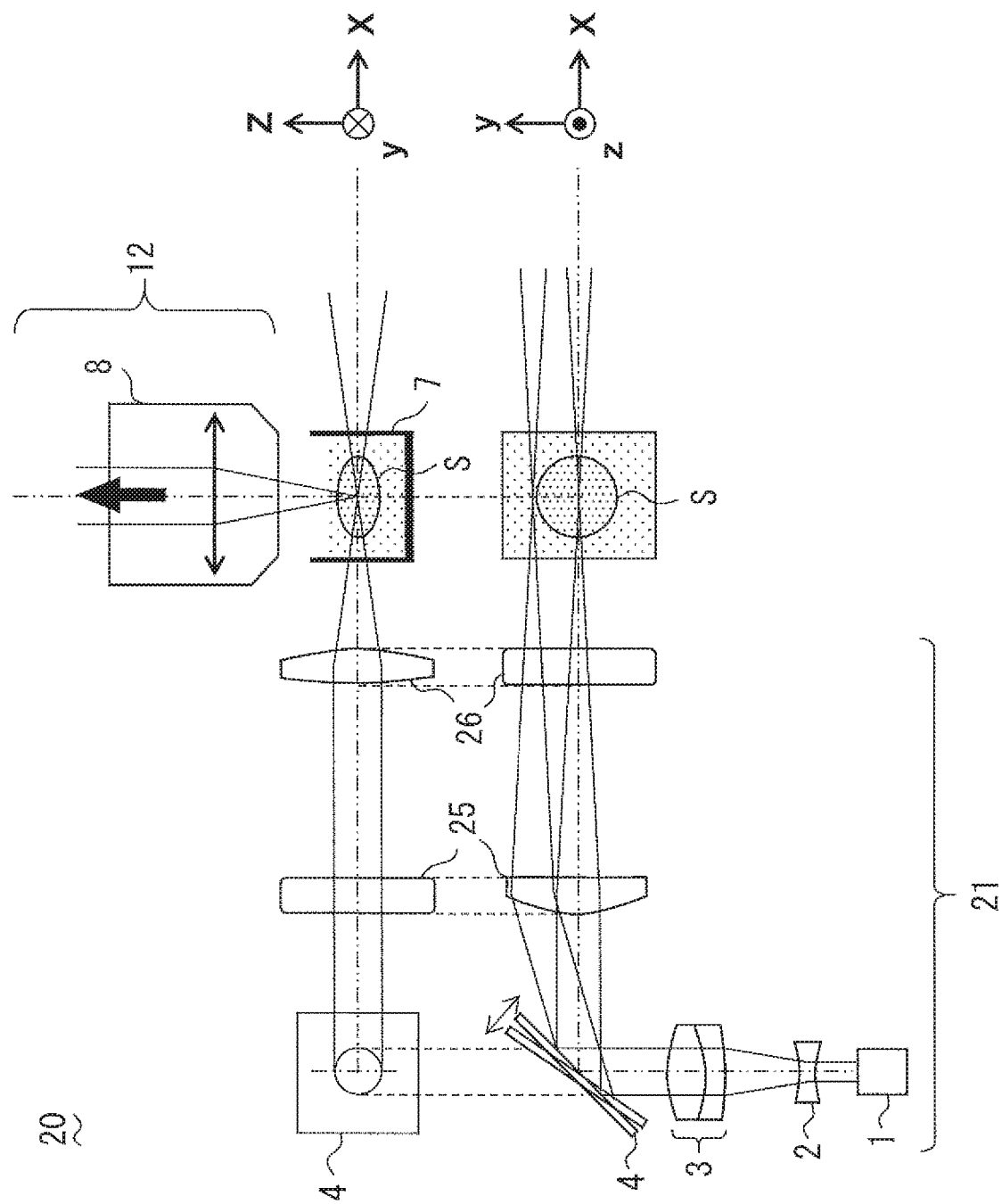
FIG. 2 illustrates a configuration of a microscope apparatus according to a second embodiment.

A microscope apparatus according to a second embodiment is described below. FIG. 2 illustrates a configuration of a microscope apparatus 20 according to the present embodiment.

The microscope apparatus 20 is different from the microscope apparatus 10 in that it includes an illumination optical system 21 instead of the illumination optical system 11. The illumination optical system 21 includes a Fresnel lens 25 and an aspherical lens 26 instead of the cylindrical lens 5 and the cylindrical lens 6.

Like the cylindrical lens 5, the Fresnel lens 25 is an optical-axis-asymmetric lens that has a power in the first-axis direction and does not have a power in the second-axis direction. The Fresnel lens 25 has a plurality of grooves, and each of the plurality of grooves serves as a refractive surface so as to cause an illumination light to be concentrated onto the Fresnel lens 25. Like the cylindrical lens 6, the aspherical lens 26 is an optical-axis-asymmetric lens that has a power in the second-axis direction and does not have a power in the first-axis direction. Further, the aspherical lens 26 is a lens having an aspherically curved shape, wherein the conic constant is not zero.

As described above, the usage of the Fresnel lens 25 and the aspherical lens 26 makes it possible to adjust a light concentration in each region such as an edge region and a central region of a lens surface, according to the design of angles of the grooves of the Fresnel lens 25 or the design of the curved shape of the aspherical lens 26. This results in being able to perform a better observation while further suppressing an aberration.

Figure 3:
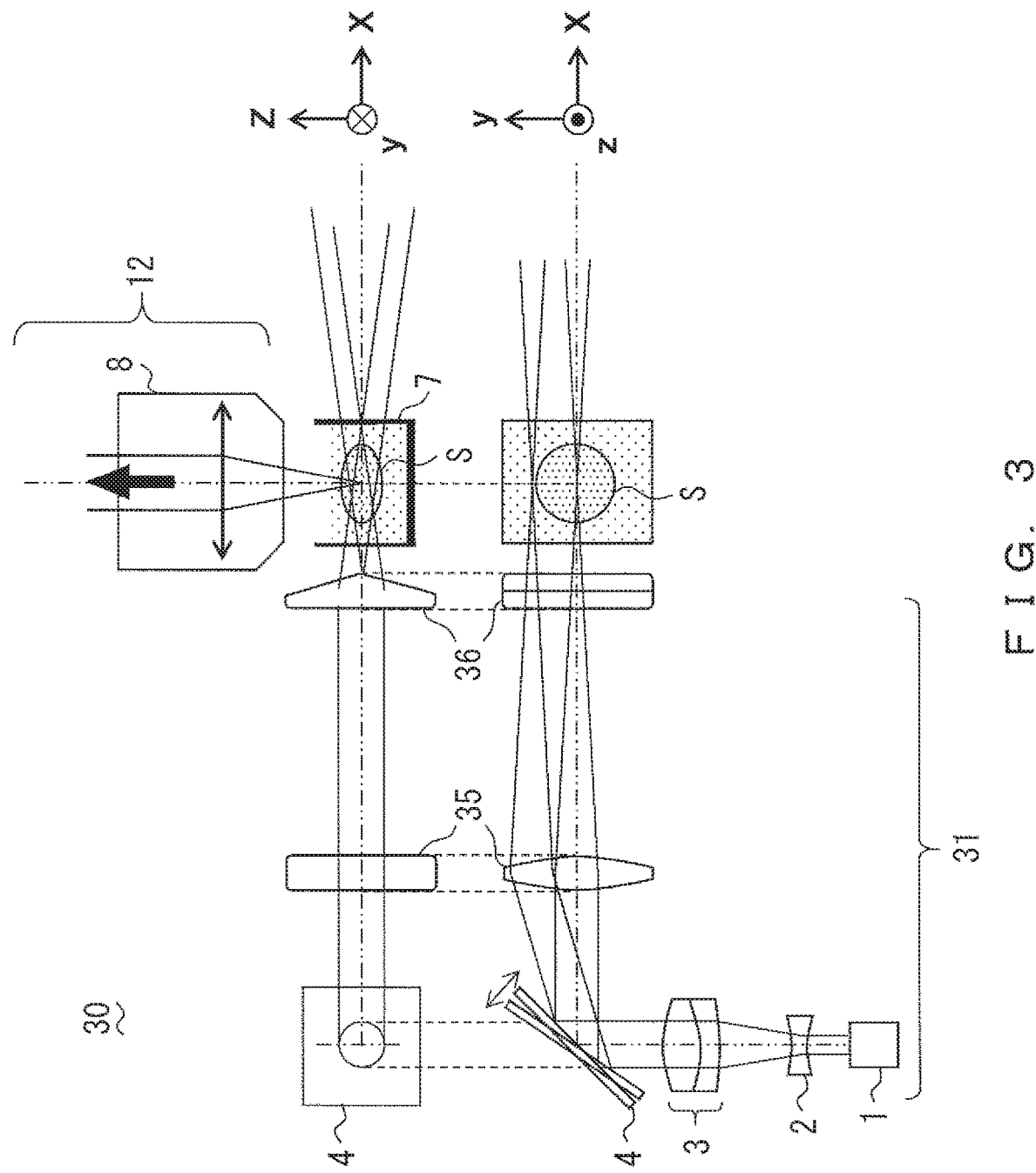
FIG. 3 illustrates a configuration of a microscope apparatus according to a third embodiment.

A microscope apparatus according to a third embodiment is described below. FIG. 3 illustrates a configuration of a microscope apparatus 30 according to the present embodiment.

The microscope apparatus 30 is different from the microscope apparatus 10 in that it includes an illumination optical system 31 instead of the illumination optical system 11. The illumination optical system 31 includes a cylindrical lens 35 and a prism 36 instead of the cylindrical lens 5 and the cylindrical lens 6. The cylindrical lens 35 is similar to the cylindrical lens 5.

Figure 4:
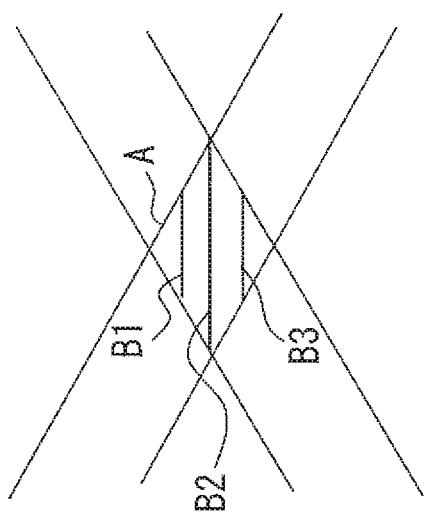
FIG. 4 illustrates how a beam is emitted from a prism.
Figure 4:
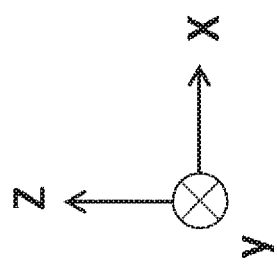

Like the cylindrical lens 6, the prism 36 is an optical-axis-asymmetric prism that has a power in the second-axis direction and does not have a power in the first-axis direction. An illumination light that is concentrated by being refracted by the prism 36 arranged as illustrated in FIG. 3 causes an interference pattern in a region A that is a region formed by beams from the prism 36 intersecting one another, so as to form a plurality of sheet-shaped light intensity distributions B1, B2, B3, . . . , as illustrated in FIG. 4. Thus, when observation is performed, a method for selecting one of the sheet lights (B1, B2, B3, . . . ) that includes adjusting a focus in a detection optical system in which a focus depth is sufficiently reduced or a method for performing restoration using image processing such as a deconvolution is used.

There is no need to always use a lens, but a prism may be used as an optical-axis-asymmetric optical element (an optical-axis-asymmetric optical system), as in the configuration of the microscope apparatus 30 described above.

Figure 5:
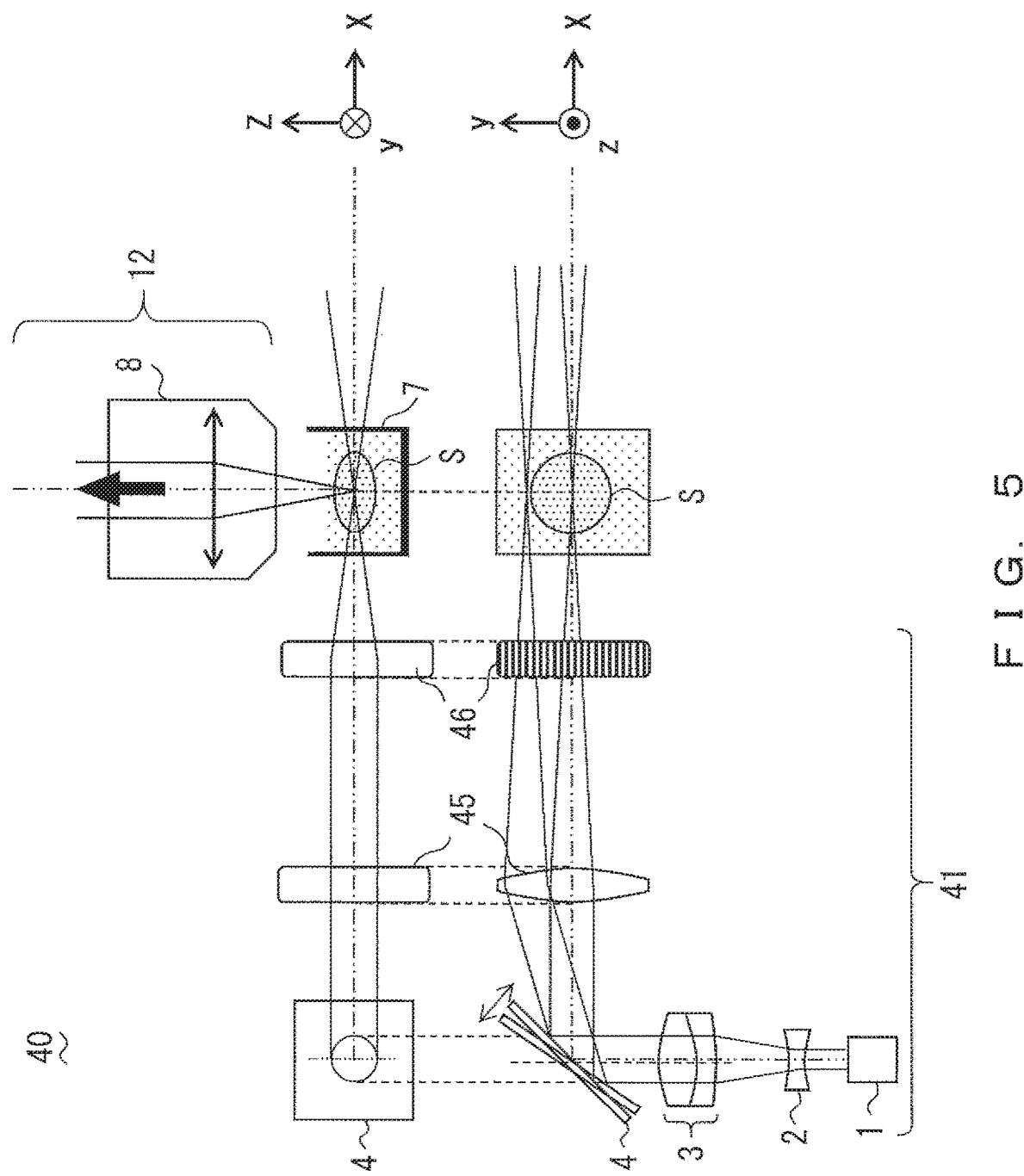
FIG. 5 illustrates a configuration of a microscope apparatus according to a fourth embodiment.

A microscope apparatus according to a fourth embodiment is described below. FIG. 5 illustrates a configuration of a microscope apparatus 40 according to the present embodiment.

The microscope apparatus 40 is different from the microscope apparatus 10 in that it includes an illumination optical system 41 instead of the illumination optical system 11. The illumination optical system 41 includes a cylindrical lens 45 and a DOE 46 instead of the cylindrical lens 5 and the cylindrical lens 6. The cylindrical lens 45 is similar to the cylindrical lens 5.

The DOE 46 is a diffractive lens that concentrates and diverges light using a diffraction phenomenon caused by a plurality of grooves formed in the DOE 46. In the present embodiment, the DOE 46 is an optical-axis-asymmetric diffractive lens that has a power in the second-axis direction and does not have a power in the first-axis direction. In other words, the plurality of grooves are provided so as to cause light to be concentrated at one point on the sample S in the second-axis direction. It is preferable that the DOE 46 be designed to only concentrate diffracted light of a specific order in order to avoid the occurrence of light from behind.

Even if a DOE is used as an optical-axis-asymmetric optical element (an optical-axis-asymmetric optical system), it will also be possible to provide an optical performance similar to that of a lens or a prism, as in the configuration of the microscope apparatus 40 described above.

A microscope apparatus according to a fifth embodiment is described below. FIG. 6 illustrates a configuration of a microscope apparatus 50 according to the present embodiment.

The microscope apparatus 50 is different from the microscope apparatus 10 in that it includes an illumination optical system 51 instead of the illumination optical system 11. The illumination optical system 51 includes a lens array 55 and a cylindrical lens 56 instead of the cylindrical lens 5 and the cylindrical lens 6. The cylindrical lens 56 is similar to the cylindrical lens 6.

Like the cylindrical lens 5, the lens array 55 is a lens array that is constituted of an optical-axis-asymmetric lens that has a power in the first-axis direction and does not have a power in the second-axis direction. When a lens array is used, an emission-side light concentration NA in the first-axis direction, that is, in the width direction, becomes small, but a large number of light concentration spots are formed on the sample so that a sheet light is formed in a wide range even if a scanner performs scanning at a very small angle. This configuration is preferable in order to perform scanning at a higher speed.

Figure 7:
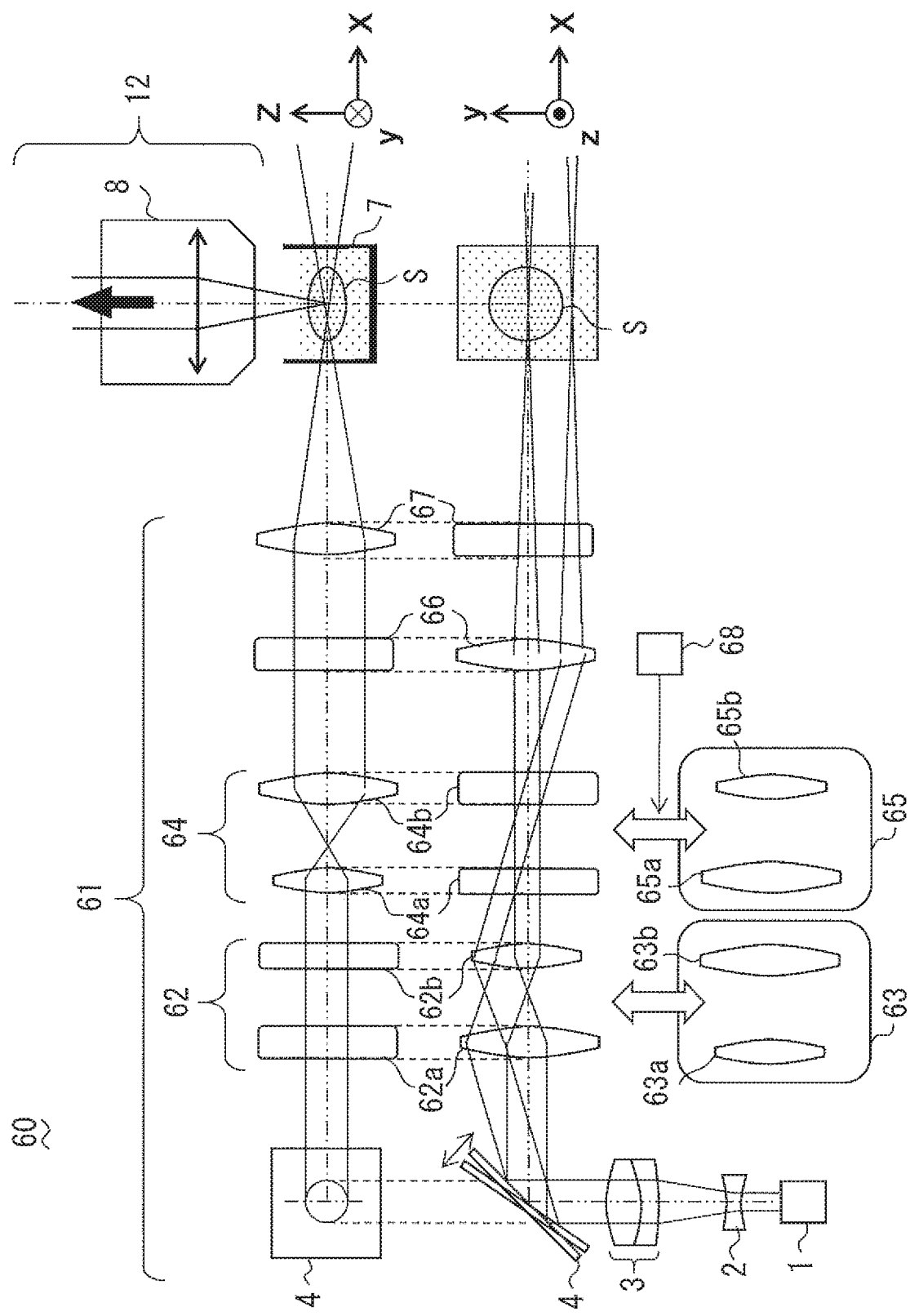
FIG. 7 illustrates a configuration of a microscope apparatus according to a sixth embodiment.

A microscope apparatus according to a sixth embodiment is described below. FIG. 7 illustrates a configuration of a microscope apparatus 60 according to the present embodiment.

The microscope apparatus 60 is different from the microscope apparatus 10 in that it includes an illumination optical system 61 instead of the illumination optical system 11 and further includes a driving mechanism 68.

The illumination optical system 61 includes a plurality of optical-axis-asymmetric elements that each have a power in the first-axis direction or the second-axis direction. Specifically, the illumination optical system 61 includes a lens group 62, a lens group 63, and a cylindrical lens 66 that are optical-axis-asymmetric optical systems each having a power in the first-axis direction and not having a power in the second-axis direction. The illumination optical system 61 further includes a lens group 64, a lens group 65, and a cylindrical lens 67 that are optical-axis-asymmetric optical systems each having a power in the second-axis direction and not having a power in the first-axis direction. The lens group 63 is placed in an optical path by the driving mechanism 68 performing switching between the lens group 62 and the lens group 63, and the lens group 65 is placed in the optical path by the driving mechanism 68 performing switching between the lens group 64 and the lens group 65. FIG. 7 illustrates the lens groups 62 and 64 being placed in the optical path. The cylindrical lens 66 and the cylindrical lens 67 are similar to the cylindrical lens 5 and the cylindrical lens 6, respectively.

The lens group 62 includes cylindrical lenses 62*a* and 62*b* that have focal lengths different from each other. Here, it is assumed that the focal length of the cylindrical lens 62*a* is longer than the focal length of the cylindrical lens 62*b*. In other words, the lens group 62 is arranged as illustrated in FIG. 7 so as to reduce the diameter of a beam when the beam is emitted from the lens group 62, compared to when the beam is incident on the lens group 62.

The lens group 63 includes cylindrical lenses 63*a* and 63*b* that have focal lengths different from each other. Conversely to the lens group 62, the lens group 63 has a configuration in which the cylindrical lens 63*b* having a longer focal length is arranged posterior to the cylindrical lens 63*a*, which increases the diameter of a beam when the beam is emitted from the lens group 63, compared to when the beam is incident on the lens group 63.

The lens group 64 includes cylindrical lenses 64*a* and 64*b* that have focal lengths different from each other. The lens group 64 has a configuration in which the cylindrical lens 64*b* having a longer focal length is arranged posterior to the cylindrical lens 64*a*, which increases the diameter of a beam when the beam is emitted from the lens group 64, compared to when the beam is incident on the lens group 64.

The lens group 65 includes cylindrical lenses 65*a* and 65*b* that have focal lengths different from each other. Conversely to the lens group 64, the lens group 65 has a configuration in which the cylindrical lens 65*a* having a longer focal length is arranged posterior to the cylindrical lens 65*b*, which reduces the diameter of a beam when the beam is emitted from the lens group 65, compared to when the beam is incident on the lens group 65.

The driving mechanism 68 serves as a switching mechanism that switches the lens group to be placed in the optical path. Specifically, the driving mechanism 68 performs switching between the lens groups 62 and 63 so as to place the lens group 62 or 63 in the optical path, and performs switching between the lens groups 64 and 65 so as to place the lens group 64 or 65 in the optical path. The driving mechanism 68 is, for example, a motor. Further, the driving mechanism 68 may include two different motors (driving mechanisms), and switching between the lens groups 62 and 63 may be performed by one of the motors and switching between the lens groups 64 and 65 may be performed by the other motor.

Thus, the driving mechanism 68 changes the beam diameter in the illumination optical system 61 by switching the lens group. In other words, the driving mechanism 68 serves as a device that changes an emission-side light concentration NA of the illumination optical system 61. Specifically, the driving mechanism 68 serves as a first numerical-aperture-changing unit that changes an emission-side light concentration NA of the illumination optical system 61 in the first-axis direction by switching the lens group to be placed in the optical path between the lens group 62 and the lens group 63. Further, the driving mechanism 68 serves as a second numerical-aperture-changing unit that changes an emission-side light concentration NA of the illumination optical system 61 in the second-axis direction by switching the lens group to be placed in the optical path between the lens group 64 and the lens group 65.

The configuration described above makes it possible to change the emission-side light concentration NA of the illumination optical system 61 independently in the first-axis direction (width direction) and in the second-axis direction (thickness direction), the illumination optical system 61 forming a sheet light. The thickness of a formed sheet light can be changed by adjusting the emission-side light concentration NA in the thickness direction of the formed sheet light. For example, if an emphasis is put on improving a detection resolution upon performing observation, it will be possible to improve a detection resolution in the second-axis direction by reducing the thickness of a sheet light. Further, if a radiated range is desired to be broadened in a direction of an illumination optical axis (X-axis direction) so as to improve efficacy in observation, it will be possible to broaden the radiated range in the direction of the illumination optical axis (X-axis direction) by increasing the thickness of a sheet light.

Further, the radiated range is changed in the width direction of a sheet light on the sample S by adjusting the emission-side light concentration NA in the width direction of the sheet light. A radiated range is reduced by reducing the emission-side light concentration NA in the first-axis direction, so as to further suppress fading on the sample S, and an effect of removing a shadow using the scanner 4 can be increased by increasing the emission-side light concentration NA.

As described above, the microscope apparatus 60 makes it possible to form an optimal sheet light according to the intension of an observer and to observe the sample S.

It is preferable that, in this configuration, the scanner 4 be arranged in a plane conjugate to a front focal plane of the cylindrical lens 66. This makes it possible to make a principal ray of an illumination light emitted from the cylindrical lens 66 parallel to the X-axis even if the illumination light is deflected by the scanner 4. In other words, the illumination optical system 61 becomes a telecentric optical system. If the illumination optical system 61 is a telecentric optical system, the uniformity of an illumination light radiated onto the sample S is ensured.

Figure 8:
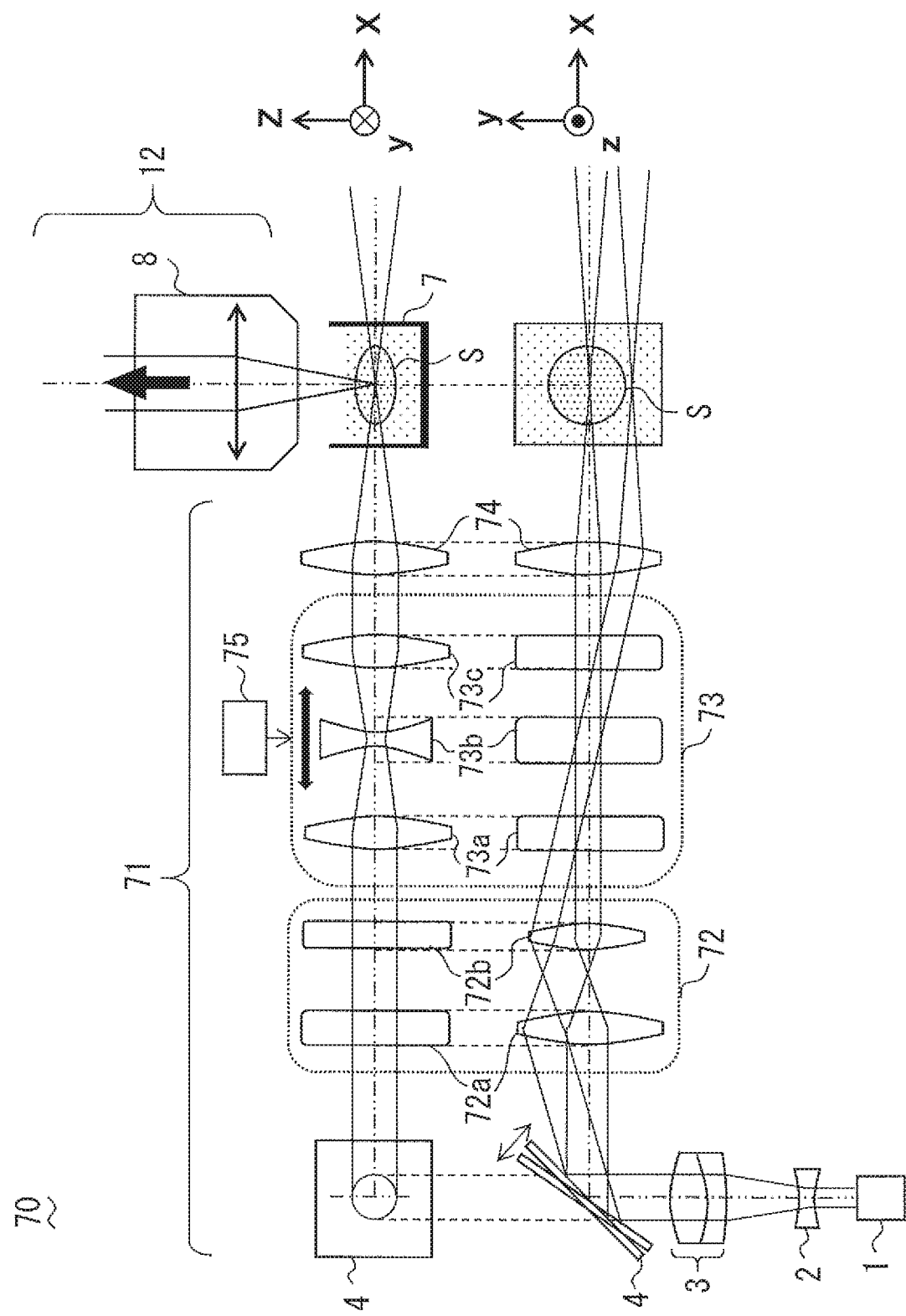
FIG. 8 illustrates a configuration of a microscope apparatus according to a seventh embodiment.

A microscope apparatus according to a seventh embodiment is described below. FIG. 8 illustrates a configuration of a microscope apparatus 70 according to the present embodiment.

The microscope apparatus 70 is different from the microscope apparatus 10 in that it includes an illumination optical system 71 instead of the illumination optical system 11 and further includes a driving mechanism 75.

The illumination optical system 71 includes a plurality of optical-axis-asymmetric elements that each have a power in the first-axis direction or the second-axis direction. Specifically, the illumination optical system 71 includes a lens group 72 that is an optical-axis-asymmetric optical system having a power in the first-axis direction and not having a power in the second-axis direction. The illumination optical system 71 further includes a lens group 73 that is an optical-axis-asymmetric optical system having a power in the second-axis direction and not having a power in the first-axis direction.

The lens group 73 includes cylindrical lenses 73a, 73b, and 73c. The cylindrical lenses 73a and 73c are convex cylindrical lenses, and the cylindrical lens 73b is a concave cylindrical lens. The lens group 73 is arranged as illustrated in FIG. 8 so that a collimated beam that is incident on the cylindrical lens 73a is emitted from the cylindrical lens 73c in the form of a collimated beam. Here, the diameter of the beam emitted from the lens group 73 is changed by changing the arrangement of the cylindrical lens 73b in the X-axis direction.

The driving mechanism 75 changes the arrangement of the cylindrical lens 73b in the lens group 73 in the X-axis direction. The diameter of a beam emitted from the lens group 73 is increased by the driving mechanism 75 moving the cylindrical lens 73b closer to the cylindrical lens 73a. Conversely, the diameter of a beam emitted from the lens group 73 is reduced by the driving mechanism 75 moving the cylindrical lens 73b closer to the cylindrical lens 73c. In other words, the cylindrical lens 73b serves as a zoom lens.

This configuration of the lens group 73 and the driving mechanism 75 also makes it possible to change the emission-side light concentration NA of the illumination optical system 71 to an emission-side light concentration NA in the other axis direction (here, in the second-axis direction). Accordingly, it is possible to provide an effect similar to the effect described in the sixth embodiment.

FIG. 8 illustrates the lens group 72 having a configuration similar to that of the lens group 62 of the sixth embodiment. A combination of different configurations may be used as a configuration for changing the emission-side light concentration NA of an illumination optical system, such as a combination of the configuration of the sixth embodiment and the configuration described above in which a zoom lens is used, the configuration of the sixth embodiment being used as a configuration for changing the diameter of a beam emitted from the lens group 72, the configuration described above in which a zoom lens is used being used as a configuration for changing the diameter of a beam emitted from the lens group 73. Further, for example, the lens group 72 may also be modified such that the beam diameter is changed using a zoom lens, as in the configuration of the lens group 73.

Further, for convenience, a lens 74 that is a spherical lens is arranged in the illumination optical system 71 as an element arranged closest to the sample S, but the cylindrical lens 66 and the cylindrical lens 67 of the sixth embodiment may be arranged instead of the lens 74.

A microscope apparatus according to an eighth embodiment is described below. FIG. 9 illustrates a configuration of a microscope apparatus 80 according to the present embodiment.

An illumination optical system 81 includes a plurality of optical-axis-asymmetric elements that each have a power in the first-axis direction or the second-axis direction. Specifically, the illumination optical system 81 includes a lens group 82 that is an optical-axis-asymmetric optical system having a power in the first-axis direction and not having a power in the second-axis direction. The illumination optical system 81 further includes a lens group 83 that is an optical-axis-asymmetric optical system having a power in the second-axis direction and not having a power in the first-axis direction.

The lens group 83 includes a Powell lens 83a and a cylindrical lens 83b. The Powell lens 83a diverges a collimated beam from the lens group 82 in a fan-like manner, so the collimated beam becomes a beam having a uniform intensity distribution in the second-axis direction when it is emitted from the cylindrical lens 83b situated posterior to the Powell lens 83a. Here, the diameter of the beam emitted from the lens group 82 in the second-axis direction is increased due to the divergent angle of the Powell lens 83a and the focal length of the cylindrical lens 83b. Thus, the usage of a Powell lens makes it possible to change the emission-side light concentration NA in the second-axis direction while further enhancing the uniformity of an intensity distribution in the thickness direction of a sheet light (the second-axis direction), the sheet light being formed through the illumination optical system 81.

The microscope apparatus 80 may further include a driving mechanism that performs switching between the lens group 82 or 83 and a different lens group. The inclusion of a driving mechanism permits switching of the lens group to be arranged in an optical path, as in the case of the driving mechanism 68 of the sixth embodiment, which results in being able to change the emission-side light concentration NA of the illumination optical system 81.

Further, for convenience, a lens 84 that is a spherical lens is arranged in the illumination optical system 81 as an element arranged closest to the sample S, but the cylindrical lens 66 and the cylindrical lens 67 of the sixth embodiment may be arranged instead of the lens 84.

Further, the illumination optical system 81 may include a stop 85. The stop 85 is a light-blocking member that blocks a beam in the first-axis direction so as to limit the width of a sheet light formed on the sample S. Further, it is preferable that the stop 85 and the scanner 4 be arranged in a front focal plane of the lens 84 or in a plane conjugate to the front focal plane. By arranging as described above, the illumination optical system 81 can become a telecentric optical system.

Figure 10:
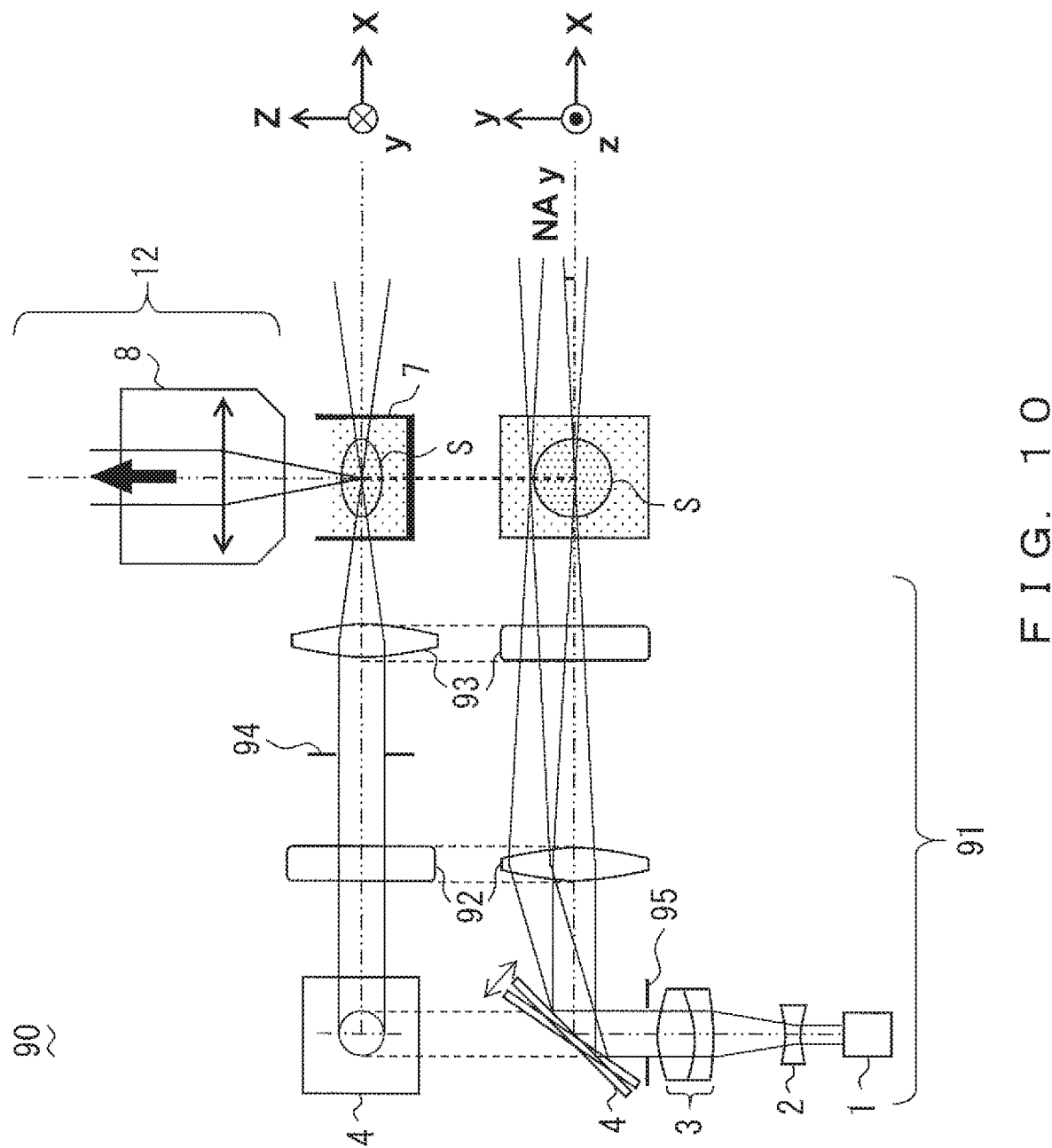
FIG. 10 illustrates a configuration of a microscope apparatus according to a ninth embodiment.

A microscope apparatus according to a ninth embodiment is described below. FIG. 10 illustrates a configuration of a microscope apparatus 90 according to the present embodiment.

The microscope apparatus 90 is different from the microscope apparatus 10 in that it includes an illumination optical system 91 instead of the illumination optical system 11. The illumination optical system 91 includes cylindrical lenses 92 and 93 instead of the cylindrical lenses 5 and 6, and stops 94 and 95. The cylindrical lenses 92 and 93 are similar to the cylindrical lenses 5 and 6, respectively.

The stop 94 is a light-blocking member that blocks a beam in the second-axis direction and limits the thickness of a formed sheet light. The stop 95 is a light-blocking member that blocks a beam in the first-axis direction and limits the width of a formed sheet light and the ray angle for removing a shadow on the sample that is created due to diffusion. The stops 94 and 95 are independently variable, and a level of reducing a beam diameter is adjusted by a driving mechanism (not illustrated). In other words, a driving mechanism is included that is a light-blocking device and changes ranges in which the stops 94 and 95 block light.

When these variable stops are included, the emission-side light concentration NA of an illumination optical system is changed independently in the first-axis direction and the second-axis direction. In other words, the inclusion of a variable stop also makes it possible to adjust the thickness of a formed sheet light and a shadow removal effect.

Figure 11:
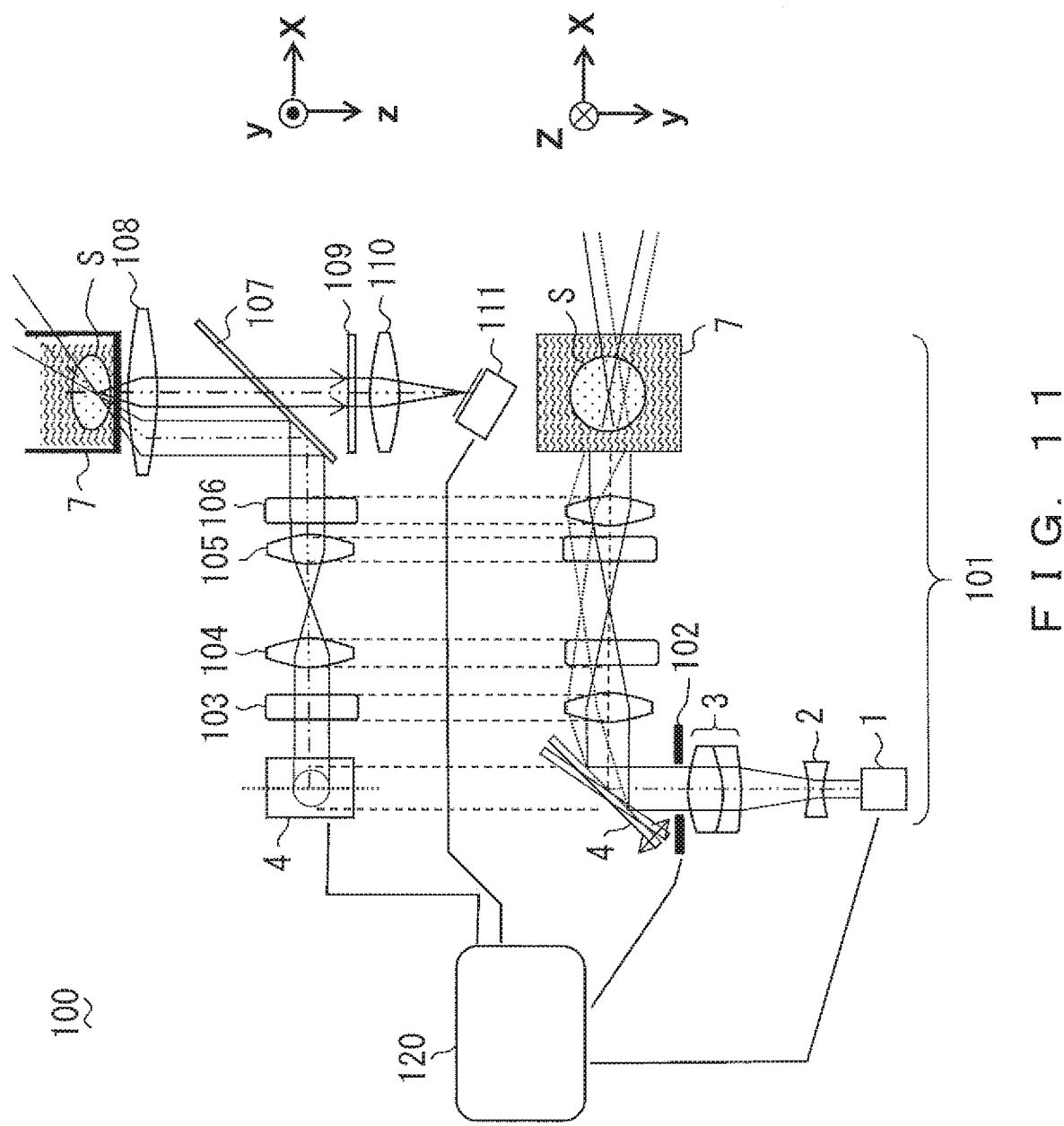
FIG. 11 illustrates a configuration of a microscope apparatus according to a tenth embodiment.

A microscope apparatus according to a tenth embodiment is described below. FIG. 11 illustrates a configuration of a microscope apparatus 100 according to the present embodiment.

The microscope apparatus 100 is different from the microscope apparatuses described above in that it includes an illumination optical system 101 instead of the illumination optical system 11 and has a configuration of an epi-illumination microscope.

The microscope apparatus 100 includes the illumination optical system 101, a barrier filter 109, a lens 110, an imaging element 111, and a control device 120.

The illumination optical system 101 is different from the illumination optical system 11 in that it includes cylindrical lenses 103, 104, 105, and 106 instead of the cylindrical lenses 5 and 6, and further includes a stop 102, a dichroic mirror 107, and an objective 108.

The cylindrical lenses 103 and 106 are optical-axis-asymmetric optical systems that each have a power in the first-axis direction and do not have a power in the second-axis direction. The cylindrical lenses 104 and 105 are optical-axis-asymmetric optical systems that each have a power in the second-axis direction and do not have a power in the first-axis direction.

Figure 12:
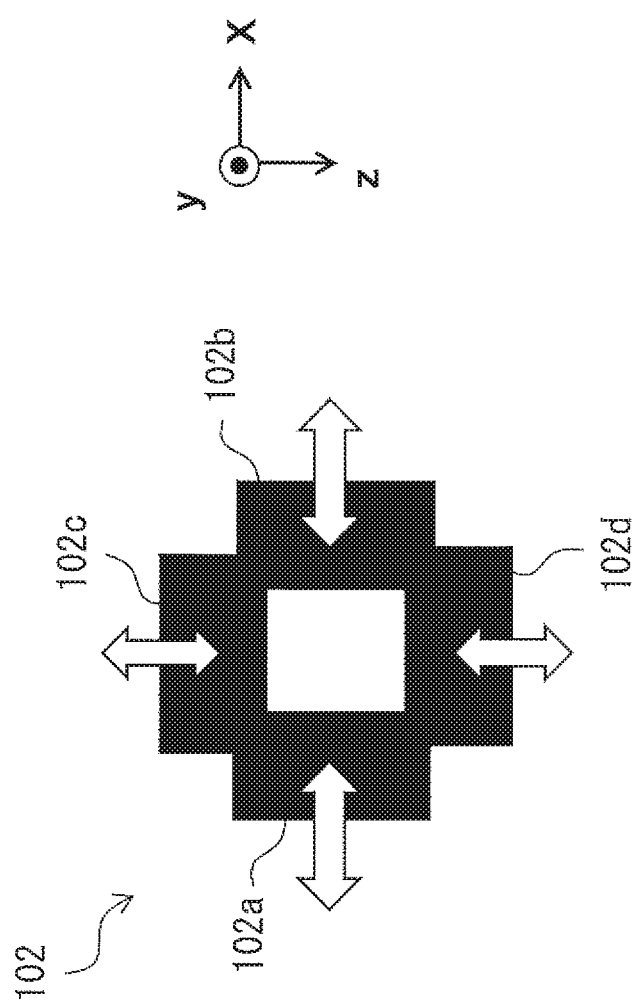
FIG. 12 illustrates a configuration of a stop in the tenth embodiment.

The stop 102 is a light-blocking member that blocks a beam in the first-axis direction and the second-axis direction and limits the thickness of a formed sheet light. FIG. 12 illustrates a configuration of the stop 102. The stop 102 includes light-blocking plates 102a to 102d that can be independently moved, and a level of reducing a beam diameter is adjusted by each light-blocking plate moving in a direction indicated by a respective arrow. Specifically, it is possible to change the emission-side light concentration NA of the illumination optical system in the first-axis direction by moving the light-blocking plates 102a and 102b. It is possible to change the emission-side light concentration NA of the illumination optical system in the second-axis direction by moving the light-blocking plates 102c and 102d.

The dichroic mirror 107 is configured such that an illumination light beam output by the light source 1 is reflected onto the dichroic mirror 107 and fluorescence from the sample S is transmitted through the dichroic mirror 107. Examples of the imaging element 111 are a CCD camera and a CMOS.

The illumination light beam emitted from the cylindrical lens 106 is reflected onto the dichroic mirror 107 and enters the sample S through the objective 108. Here, when a rear focal position of the cylindrical lens 106 is aligned with a pupil position of the objective 108, the illumination light beam becomes telecentric with respect to scanning of the illumination light beam performed by the scanner 4, which results in being able to make a sheet light formed in the first-axis direction uniform. The fluorescence generated from the sample S passes through the objective 108 and the dichroic mirror 107 and arrives at the imaging element 111 through the barrier filter 109 and the lens 110.

Here, the microscope apparatus 100 has a non-coaxial-epi-illumination configuration in which the position of an optical axis of an illumination light beam (illumination optical axis) that passes through the objective 108 and the position of an optical axis of fluorescence (observation optical axis) that passes through the objective 108 are different from each other. The illumination light beam enters the objective 108 from a position away from an optical axis of the objective 108 and is obliquely radiated onto the sample S from the objective 108. A fluorescence image is formed by the lens 110 obliquely with respect to the optical axis of the objective 108, so it is possible to obtain an image of a formed sheet light in a plane by obliquely arranging the imaging element 111.

The control device 120 controls, for example, settings of the imaging element 111 such as a setting of outputting a pixel, and ON/OFF of the light source 1. Further, the control device 120 controls operations of each light-blocking plate of the stop 102 and the scanner 4.

The microscope apparatus 100 having the configuration described above is a light-sheet microscope in which an illumination optical axis and an observation optical axis are not perpendicular to each other.

This configuration also makes it possible to adjust the thickness of a formed sheet light and a shadow removal effect because the emission-side light concentration NA of the illumination optical system is changed independently in the first-axis direction and the second-axis direction.

As described above, the present invention makes it possible to sufficiently suppress light fading of a sample due to observation, which results in being able to obtain a better illumination optical performance while suppressing an aberration.

The embodiments described above are just examples to facilitate understanding of the present invention, and the embodiment of the present invention is not limited to these examples. Various modifications and alterations may be made to the microscope apparatus described above without departing from the scope of the invention specified in the claims.

What is claimed is:

1. A microscope apparatus comprising:
   a detection optical system that captures light from a sample; and
   an illumination optical system that has an optical axis oriented in a direction different from an optical axis of the detection optical system and that radiates an illumination light onto the sample,
   wherein:
   the illumination optical system includes:
      a first optical-axis-asymmetric optical system that has a power in a first-axis direction and does not have a power in a second-axis direction that is perpendicular to the first-axis direction,
      a second optical-axis-asymmetric optical system that has a power in the second-axis direction and does not have a power in the first-axis direction, and
      a scanning unit that scans the illumination light in a width direction that is perpendicular to the optical axis of the detection optical system and the optical axis of the illumination optical system;
   the illumination optical system is configured such that the first-axis direction is the width direction;
   the first optical-axis-asymmetric optical system and the second optical-axis-asymmetric optical system are arranged between the sample and the scanning unit; and
   the illumination optical system concentrates the illumination light onto a substantially same position in the optical axis of the illumination optical system by each of the first optical-axis-asymmetric optical system and the second optical-axis-asymmetric optical system so as to form an optical spot within a field of view of the detection optical system, and scans the optical spot so as to form a sheet light.

2. The microscope apparatus according to claim 1, wherein the scanning unit comprises a scanner that is arranged in one of a front focal plane of the first optical-axis-asymmetric optical system and a plane conjugate to the front focal plane.

3. The microscope apparatus according to claim 1, wherein the illumination optical system includes an optical system that converts a beam that enters the scanning unit into a collimated beam.

4. The microscope apparatus according to claim 1, wherein an emission-side light concentration numerical aperture of the illumination optical system in the first-axis direction is not less than 0.04.

5. The microscope apparatus according to claim 1, wherein one of the first optical-axis-asymmetric optical system and the second optical-axis-asymmetric optical system includes an aspherical lens.

6. The microscope apparatus according to claim 1, wherein the optical axis of the detection optical system and the optical axis of the illumination optical system are perpendicular to each other.

7. The microscope apparatus according to claim 1, further comprising a first numerical-aperture-changing unit that changes an emission-side light concentration numerical aperture of the illumination optical system in the first-axis direction.

8. The microscope apparatus according to claim 7, wherein:
   the illumination optical system includes a third optical-axis-asymmetric optical system that is placed in an optical path of the illumination optical system by switching being performed from the first optical-axis-asymmetric optical system placed in the optical path of the illumination optical system and that provides an emission-side light concentration numerical aperture that is different from an emission-side light concentration numerical aperture of the first optical-axis-asymmetric optical system; and
   the first numerical-aperture-changing unit comprises a switching mechanism that performs switching between the first optical-axis-asymmetric optical system and the third optical-axis-asymmetric optical system so as to place one of the first optical-axis-asymmetric optical system and the third optical-axis-asymmetric optical system in the optical path of the illumination optical system.

9. The microscope apparatus according to claim 7, wherein the first numerical-aperture-changing unit comprises a zoom lens that changes an emission-side light concentration numerical aperture of the first optical-axis-asymmetric optical system.

10. The microscope apparatus according to claim 1, further comprising a second numerical-aperture-changing unit that changes an emission-side light concentration numerical aperture of the illumination optical system in the second-axis direction.

11. The microscope apparatus according to claim 10, wherein:
   the illumination optical system includes a fourth optical-axis-asymmetric optical system that is placed in an optical path of the illumination optical system by switching being performed from the second opticalaxis-asymmetric optical system placed in the optical path of the illumination optical system and that provides an emission-side light concentration numerical aperture that is different from an emission-side light concentration numerical aperture of the second optical-axis-asymmetric optical system; and the second numerical-aperture-changing unit comprises a switching mechanism that performs switching between the second optical-axis-asymmetric optical system and the fourth optical-axis-asymmetric optical system so as to place one of the second optical-axis-asymmetric optical system and the fourth optical-axis-asymmetric optical system in the optical path of the illumination optical system.

12. The microscope apparatus according to claim 10, wherein the second numerical-aperture-changing unit comprises a zoom lens that changes an emission-side light concentration numerical aperture of the second optical-axis-asymmetric optical system.

13. The microscope apparatus according to claim 10, wherein:
the illumination optical system includes a light-blocking member that blocks a portion of the illumination light in the second-axis direction, and
the second numerical-aperture-changing unit comprises a light blocking device that changes a range in which the light-blocking member blocks the portion of the illumination light.

14. An illumination device comprising:
an illumination optical system that includes:
a first optical-axis-asymmetric optical system that has a power in a first-axis direction and does not have a power in a second-axis direction that is perpendicular to the first-axis direction;
a second optical-axis-asymmetric optical system that has a power in the second-axis direction and does not have a power in the first-axis direction; and
a scanning unit that scans an illumination light in a width direction that is perpendicular to an optical axis of the illumination optical system,
wherein:
the illumination optical system is configured such that the first-axis direction is the width direction,
the first optical-axis-asymmetric optical system and the second optical-axis-asymmetric optical system are arranged between the sample and the scanning unit, and
the illumination optical system concentrates the illumination light onto a substantially same position in the optical axis of the illumination optical system by each of the first optical-axis-asymmetric optical system and the second optical-axis-asymmetric optical system so as to form an optical spot within a field of view of a detection optical system, and scans the optical spot so as to form a light sheet.

* * * * *